United States Patent
Barron et al.

(10) Patent No.: US 9,747,032 B2
(45) Date of Patent: Aug. 29, 2017

(54) SYSTEM AND METHOD FOR LOCATION-BASED DEVICE NAMING

(71) Applicant: NetApp, Inc., Sunnyvale, CA (US)

(72) Inventors: Edward Barron, Pepperell, MA (US); James Silva, Bedford, MA (US)

(73) Assignee: NetApp, Inc., Sunnyvale, CA (US)

( * ) Notice: Subject to any disclaimer, the term of this patent is extended or adjusted under 35 U.S.C. 154(b) by 580 days.

(21) Appl. No.: 14/276,611

(22) Filed: May 13, 2014

(65) Prior Publication Data

US 2015/0331894 A1    Nov. 19, 2015

(51) Int. Cl.
G06F 17/30 (2006.01)
G06F 3/06 (2006.01)
H04L 29/12 (2006.01)
H04L 29/08 (2006.01)

(52) U.S. Cl.
CPC .......... *G06F 3/0605* (2013.01); *G06F 3/0631* (2013.01); *G06F 3/0632* (2013.01); *G06F 3/0689* (2013.01); *G06F 17/30209* (2013.01); *G06F 17/30339* (2013.01); *G06F 17/30525* (2013.01); *G06F 17/30864* (2013.01); *G06F 17/30914* (2013.01); *H04L 61/3045* (2013.01); *H04L 61/609* (2013.01); *H04L 67/1097* (2013.01)

(58) Field of Classification Search
CPC ...................................................... G06Q 30/00
USPC ................................ 707/695, 830; 705/26.9
See application file for complete search history.

(56) References Cited

U.S. PATENT DOCUMENTS

| | | | | |
|---|---|---|---|---|
| 6,311,242 B1* | 10/2001 | Falkenburg | ......... | G06F 13/4081 345/503 |
| 8,285,688 B2* | 10/2012 | Krishnaswamy | ......... | G06F 8/71 707/687 |
| 2010/0325304 A1* | 12/2010 | Wimmer | ................. | H04L 67/12 709/232 |
| 2011/0251920 A1* | 10/2011 | Watson | ................ | G01C 21/206 705/26.9 |
| 2012/0239504 A1* | 9/2012 | Curlander | .............. | G06Q 30/02 705/14.66 |
| 2014/0019201 A1* | 1/2014 | Appel | ..................... | G06Q 30/00 705/7.29 |
| 2014/0279238 A1* | 9/2014 | Jones | ................ | G06Q 30/0617 705/26.43 |
| 2014/0379634 A1* | 12/2014 | Yoakum | .............. | G06F 17/3056 707/609 |

(Continued)

*Primary Examiner* — Baoquoc N To
(74) *Attorney, Agent, or Firm* — LeClairRyan, a Professional Corporation

(57) ABSTRACT

A system and method for uniquely identifying a storage device among an array of storage devices of a storage system is provided. In some embodiments, a storage device of the storage system is identified. The storage device may currently lack a name or may have an invalid name. A shelf identifier of a storage device shelf in which the storage device is installed is determined. A stack identifier associated with a connection of the storage device is also determined. The storage system constructs a device name for the storage device based on the shelf identifier and the stack identifier. In some such embodiments, a bay in which the storage device is installed is determined, and the device name is further based on an identifier of the bay. The device name may include the stack identifier, the shelf identifier, and/or the identifier of the bay.

16 Claims, 6 Drawing Sheets

| Device UID | Device Name | Stack ID | Shelf UID | Bay |
|---|---|---|---|---|
| 7D3E367974 | 00.12.0 | 00 | 12 | 0 |
| 507B4B502D | 00.12.1 | 00 | 12 | 1 |
| 3B78775729 | 00.12.2 | 00 | 12 | 2 |
| 7C47296641 | 03.9B.0 | 03 | 9B | 0 |
| 4E486E7979 | 00.8A.0 | 00 | 8A | 0 |
| 545248285B | 02.42.4 | 02 | 42 | 4 |
| 455C2F4A51 | 01.58.3 | 01 | 58 | 3 |
| 283B316170 | 01.58.0 | 01 | 58 | 0 |
| 4865333A6C | 00.12.3 | 00 | 12 | 3 |
| 43553D4F35 | 01.58.1 | 01 | 58 | 1 |

(56) References Cited

U.S. PATENT DOCUMENTS

2015/0294397 A1* 10/2015 Croy .................. G06Q 30/0603
   705/26.9
2016/0012516 A1* 1/2016 Croy .................. G06Q 30/0603
   705/26.9

* cited by examiner

| Device UID | Device Name | Stack ID | Shelf UID | Bay |
|---|---|---|---|---|
| 7D3E367974 | 00.12.0 | 00 | 12 | 0 |
| 507B4B502D | 00.12.1 | 00 | 12 | 1 |
| 3B78775729 | 00.12.2 | 00 | 12 | 2 |
| 7C47296641 | 03.9B.0 | 03 | 9B | 0 |
| 4E486E7979 | 00.8A.0 | 00 | 8A | 0 |
| 545248285B | 02.42.4 | 02 | 42 | 4 |
| 455C2F4A51 | 01.58.3 | 01 | 58 | 3 |
| 283B316170 | 01.58.0 | 01 | 58 | 0 |
| 4865333A6C | 00.12.3 | 00 | 12 | 3 |
| 43553D4F35 | 01.58.1 | 01 | 58 | 1 |

Figure 6

| Shelf UID | Stack ID |
|---|---|
| 12A3F495 | 00 |
| 18C67B7A | 00 |
| 9BC76E82 | 03 |
| 784F193A | 01 |
| 8AB5347A | 00 |
| 75BAC945 | 01 |
| 4258D2A9 | 02 |
| 14589B75 | 00 |
| 58678534 | 01 |
| 12348A7E | 02 |

Figure 5

SYSTEM AND METHOD FOR LOCATION-BASED DEVICE NAMING

TECHNICAL FIELD

The present description relates to data storage and retrieval and, more specifically, to assigning names to storage devices based on the devices' respective physical locations.

BACKGROUND

Networks and distributed storage allow data and storage space to be shared between devices located anywhere a connection is available. Improvements in capacity and network speeds have enabled a move away from locally attached storage devices and towards centralized storage repositories such as cloud-based data storage. These centralized offerings are finally delivering the promised advantages of security, worldwide accessibility, and data redundancy. To provide these services, storage systems may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out a storage architecture to meet these expectations enables the next generation of applications, which is expected to bring even greater demand.

As the number of storage devices per storage system has grown, ad hoc methods of arranging and configuring the devices have grown unwieldy. A modern storage system may include thousands of individual storage devices spanning dozens of racks. In such systems, locating a particular storage device may entail a time-consuming hunt, often complicated by the inability of failing hardware to assist in the search. Likewise, configuring a storage system after install new storage devices can prove daunting. Even software-based tasks may become overly complicated. For example, as configuration files become more complex, allocating storage devices to RAID groups may become increasingly burdensome. These effects may be further compounded by the trend towards increasing the number of storage controllers within a storage system to support the increased number of storage devices.

Therefore, in order to manage this growing complexity, a need exists for techniques for organizing and labeling storage devices within storage systems. In particular, systems and methods for naming storage devices based in part on their physical location may present a clearer picture of the underlying hardware. Thus, while existing techniques for assigning names to storage device have been generally adequate, the techniques described herein provide an improved representation of a storage system that is transparent and easily understood.

BRIEF DESCRIPTION OF THE DRAWINGS

The present disclosure is best understood from the following detailed description when read with the accompanying figures.

FIG. 5 is a diagram of a stack table according to aspects of the present disclosure.

FIG. 6 is a diagram of a device table according to aspects of the present disclosure.

DETAILED DESCRIPTION

Figure 1:
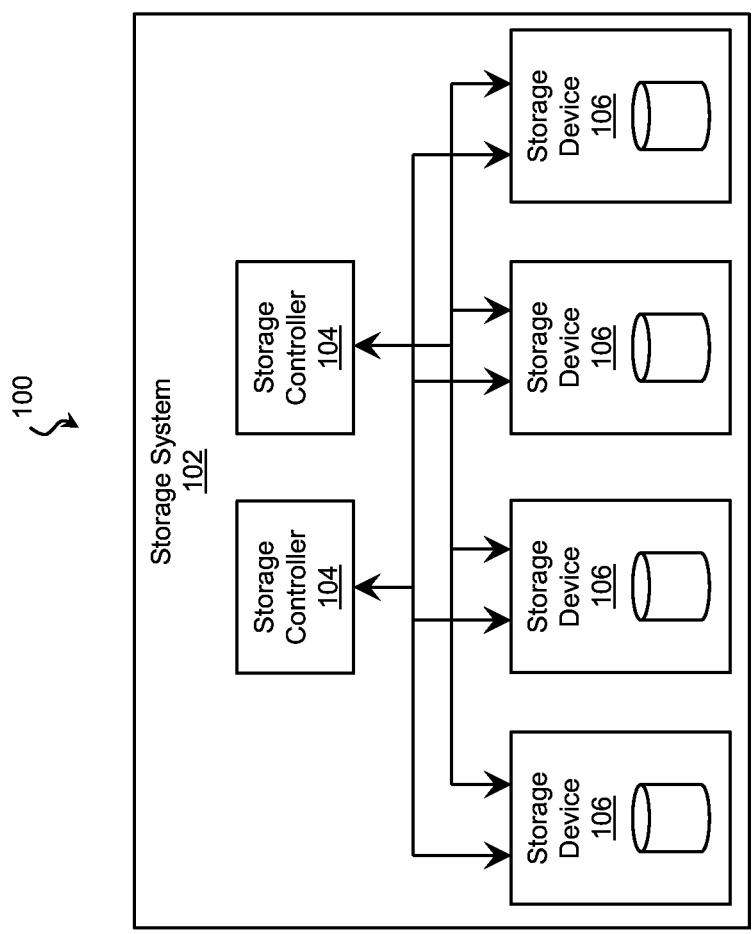
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems and methods for naming storage devices according to where the storage devices are physically located. Although the scope of embodiments is not limited to any particular use case, in one example, a storage system determines when an added or moved storage device is unnamed. The storage system determines a disk shelf and a bay that the storage device is installed in and determines a stack or connection path that the storage device is coupled to. The stack corresponds to the enclosure in which the disk shelf is mounted. From this information, the storage system assigns a name to the storage device based on a combination of the stack, the disk shelf, and/or the bay number. This name not only uniquely identifies the storage device, it provides information regarding the physical location of the storage device. This can dramatically simplify routine maintenance tasks. In addition, the naming system provides a consistent and predictable naming convention that simplifies other tasks such as assigning storage devices to a redundancy group. For example, through the use of wildcards and an orderly naming convention, redundancy groups can be spread across disk shelves with a few simple commands.

To avoid duplicating names and so that multiple storage controllers within the storage system can recognize a storage device by a single name, in a related example, the storage system maintains two tables for use in naming and device access. The stack table keeps track of the disk shelves of the storage system and records the stacks to which they belong. The device table keeps track of the storage devices of the storage system and records the respective name, stack, disk shelf, bay, and/or any other configuration information used to manage a storage device. The storage controllers query the tables before assigning a new name to ensure the name is not taken and during administrative tasks to determine the storage device a name refers to.

FIG. 1 is a schematic diagram of an exemplary storage architecture 100 according to aspects of the present disclosure. The storage architecture 100 includes a storage system 102, and while the storage system 102 is referred to as a singular entity, it may include any number of computing devices and may range from a single computing system to a system cluster of any size. Accordingly, in the illustrated embodiment, the storage system 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

The storage system 102 includes one or more storage controllers 104 communicatively coupled to one or more storage devices 106. In various examples, the storage devices 106 include hard disk drives (HDDs), solid state drives (SSDs), optical drives, and/or any other suitable volatile or non-volatile data storage medium. It is understood that for clarity and ease of explanation, only a limited number of storage controllers 104 and storage devices 106 are illustrated, although the storage system 102 may include any number of storage devices 106 coupled to any number of storage controllers 104.

The storage controllers 104 exercise low-level control over the storage devices 106 in order to execute (perform) data transactions on behalf of the storage system 102 and may also perform data transactions on behalf of other computing systems such as network-attached hosts. The storage controllers 104 provide an interface for communicating with the storage devices 106, and in that regard, may conform to any suitable hardware and/or software protocol. In various embodiments, the storage controllers 104 include Serial Attached SCSI (SAS), iSCSI, InfiniBand, Fibre Channel, and/or Fibre Channel over Ethernet (FCoE) controllers. Other suitable protocols include SATA, eSATA, PATA, USB, and FireWire. The physical connection between the storage controllers 104 and the connected storage devices may depend in part on the communication protocol and may take the form of a direct connection (e.g., a single wire or other point-to-point connection), a networked connection, or any combination thereof. Thus, in some embodiments, a storage controller 104 is communicatively coupled to a storage device 106 over a network, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. For redundancy, a single storage device 106 may be coupled to more than one storage controller 104.

In order for the storage controllers 104 and other components of the storage system 102 to address a particular storage device 106, the storage system 102 assigns an identifier or name to the storage device 106. Data transactions may use the storage device name to designate data locations, although more commonly, data transactions use a volume name rather than a storage device name for this purpose. Instead, in many embodiments, storage device names are used for management tasks including mounting devices, removing devices, updating firmware, troubleshooting, and adding storage devices to aggregate groups such as RAID (Redundant Array of Independent/Inexpensive Disks) groups. Accordingly, the storage controllers 104 may expose the name (make the name known) to APIs (Application Programming Interfaces) running on the storage system 102 for use in these tasks and others.

In some embodiments, the storage system 102 assigns storage device names based on the connection between the controller 104 and the device 106. For example, the device name may include an identifier of the storage controller 104, of a storage controller port to which the device 106 is coupled, and/or of a position where the device 106 is located on a communication loop. In this way, the storage controller 104 can determine how to address the storage device 106 from the name. However, one consequence of such naming schemes is that a storage device 106 coupled to multiple storage controllers 104 would have multiple device names, one per path and controller. In order to avoid multiple device names for a single device 106 and to provide other benefits described in further detail below, in some embodiments, the storage system 102 assigns storage device names based on the physical locations of the respective storage devices 106.

Figure 2B:
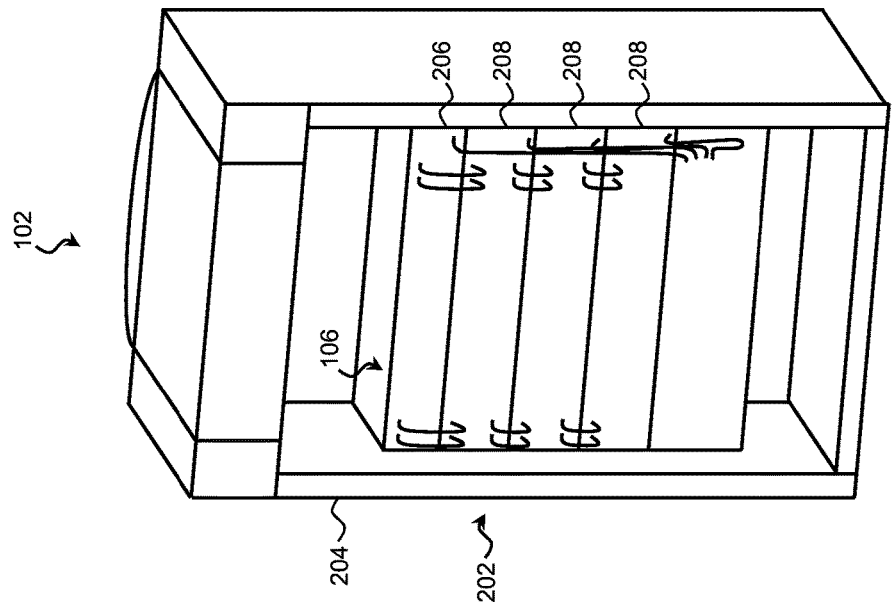
FIGS. 2A and 2B are perspective diagrams of a storage system according to aspects of the present disclosure.
Figure 2A:
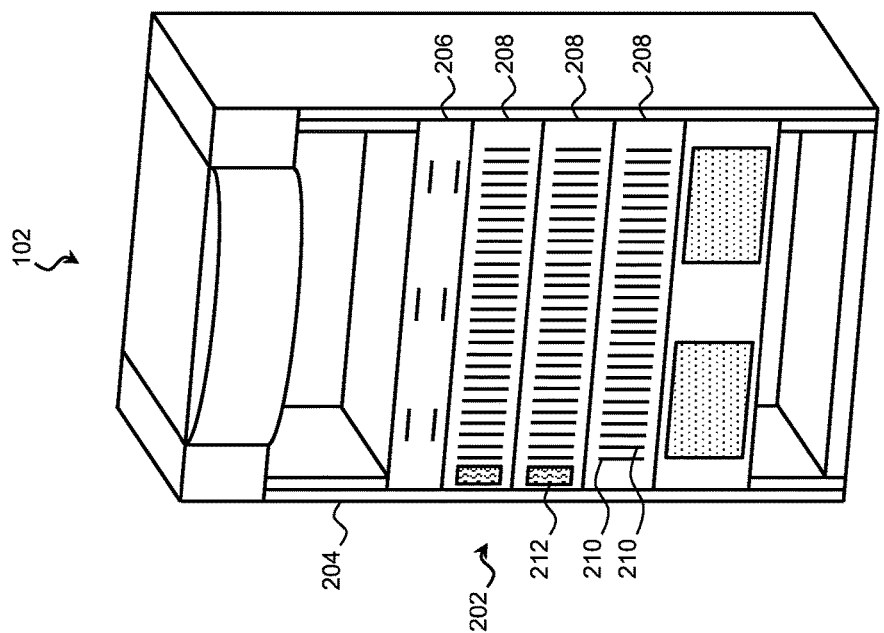

FIGS. 2A and 2B are perspective diagrams of a storage system 102 according to aspects of the present disclosure. The illustrated storage system 102 has a modular arrangement, which delivers flexibility and performance in a small footprint by incorporating interconnected computing modules 202 housed within one or more standardized enclosures 204. Customers can expand capacity by adding additional modules 202, often within the same enclosure 204. The enclosure 204 provides physical support and may provide routing channels, cable management, power, and/or cooling for the modules 202. The enclosure 204 may take any suitable form including a rack enclosure, a tower enclosure, a blade enclosure, and/or other suitable enclosure. The illustrated embodiments of FIGS. 2A and 2B may be referred to as a rack-mounted storage system 102. Other embodiments include other physical arrangements including tower and blade arrangements.

In the illustrated embodiment, the modular storage system 102 includes a storage controller module 206 having one or more storage controllers 104 such as those disclosed in FIG. 1. In this embodiment, the storage system 102 further includes a number of storage device modules 208, often referred to as "storage device shelves" or "disk shelves". The disk shelves 208 contain bays 210 that hold storage devices 106 and communicatively couple the storage devices 106 to the storage system 102. Accordingly, an exemplary bay 210 includes rails for receiving a storage device 106 and contacts for electrically coupling the storage device to the disk shelf 208. In other examples, the bay 210 only provides physical support and connections are made by wiring the storage device 106 to the disk shelf 208. The bays 210 may be numbered for reference, and for a multiple-drive bay 210 that is capable of holding more than one storage device 106, each position within the bay 210 may also be numbered for reference. In addition to bays 210, disk shelves 208 may include a display 212, such as an LCD, LED, or other suitable user display, for providing information about the disk shelf 208. One potential use of a disk shelf display 212 is described in detail below.

The disk shelves 208 may reduce wiring clutter and wiring errors by interconnecting the contained storage devices 106. In some embodiments where communication busses between storage devices 106 are integrated into the disk shelves 208, cabling is reduced to merely connecting the disk shelves 208 to storage controller 104 ports on the storage controller module 206. In some embodiments, disk shelves 208 may be daisy chained (i.e., connected to a controller module 206 via another disk shelf 208) to increase the number of disk shelves 208 connected to a given storage controller port and to further reduce wiring complexity.

The illustrated arrangement is merely one example of a storage system 102. In particular, enclosure 204 is merely an example of any enclosure that may house computing hardware, and disk shelves 208 are merely examples of sub-enclosures that may be arranged within enclosure 204 in an orderly manner. In many respects, this division of the storage system 102 into a physical hierarchy of enclosure (e.g., enclosure 204), sub-enclosures (e.g., disk shelves 208), and sub-sub-enclosures (e.g., bays 210) is merely for convenience of explanation. The methods and concepts described herein apply equally to any physical configuration.

Figure 3:
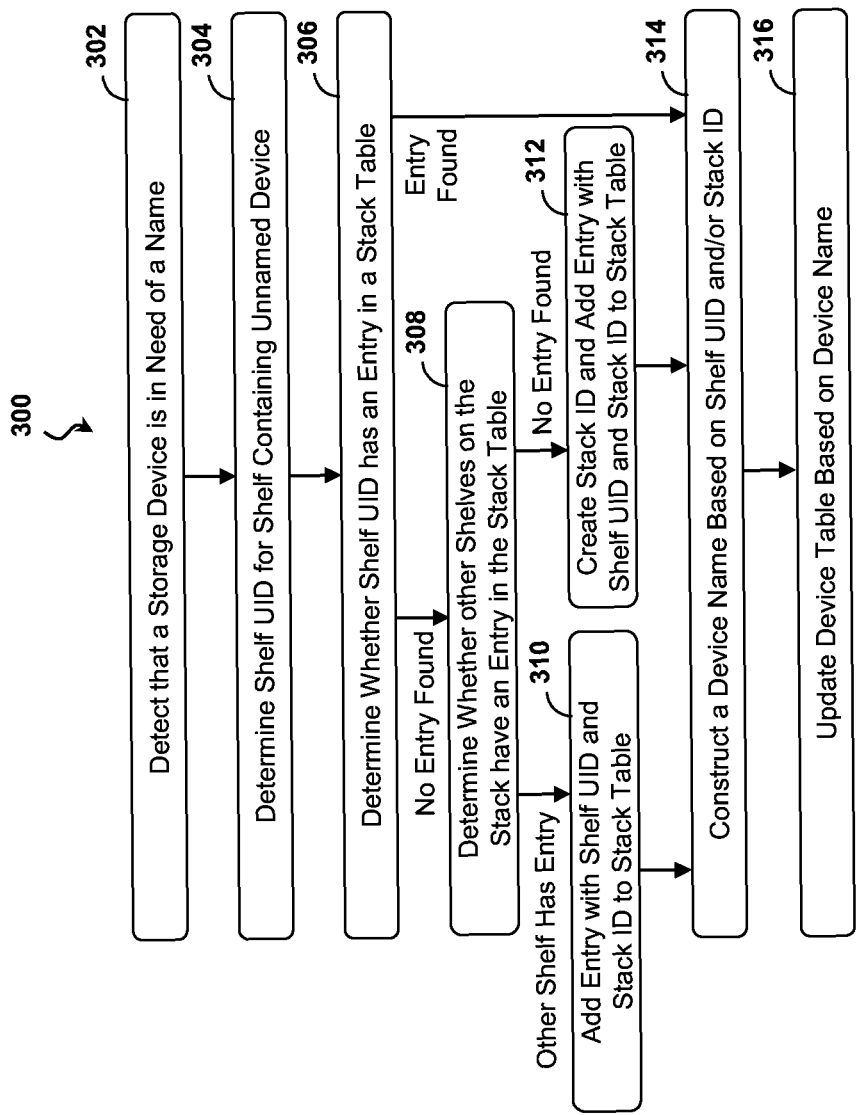
FIG. 3 is a flow diagram of a method of a naming a storage device according to aspects of the present disclosure.
Figure 4:
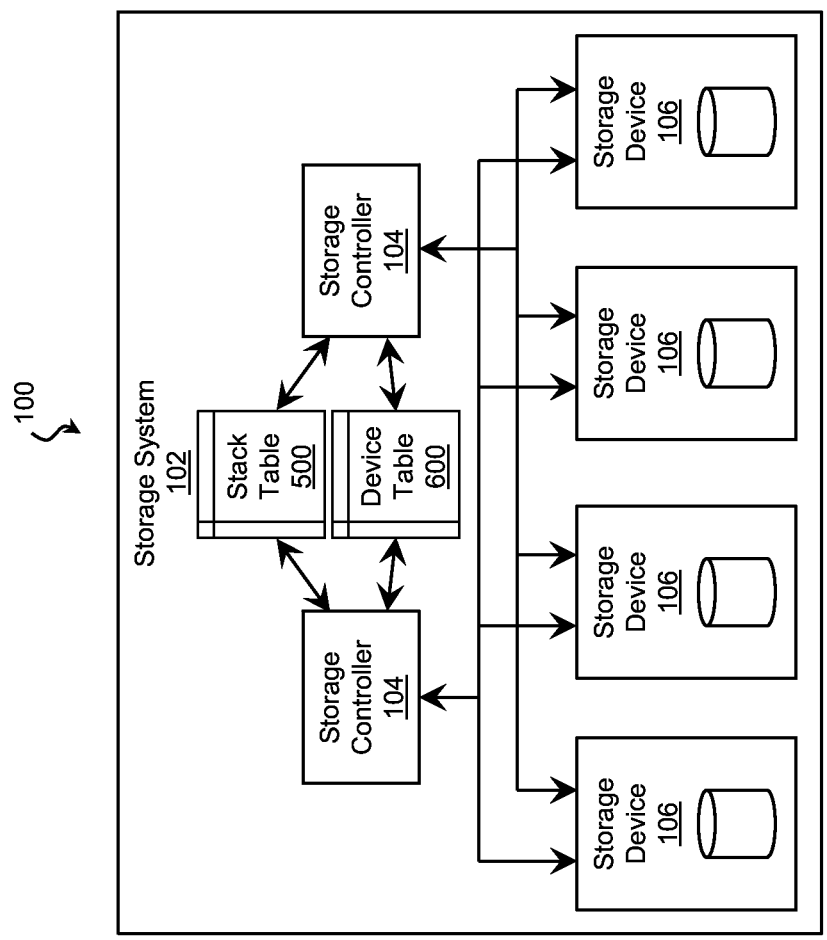
FIG. 4 is a schematic diagram of an exemplary storage architecture implementing a location-based naming convention according to aspects of the present disclosure.

As can be seen, the disk shelves 208 and the enclosure 204 give the storage system 102 an organized structure. As the number of storage devices 106, modules 202, and enclosures 204 per storage system 102 grows, it may be increasingly desirable to use this organized structure to identify storage devices 106 by incorporating disk shelf 208 and/or enclosure 204 information into the assigned name. A method of naming storage devices 106 according to their location within a modular storage system 102 is described with reference to FIGS. 3-6. FIG. 3 is a flow diagram of a method 300 of naming a storage device 106 according to aspects of the present disclosure. The method 300 is suitable for performing by the storage systems 102 of FIGS. 1 and 4. It is understood that additional steps can be provided before, during, and after the steps of method 300, and that some of the steps described can be replaced or eliminated for other embodiments of the method. FIG. 4 is a schematic diagram of an exemplary storage architecture 100 implementing a location-based naming convention according to aspects of the present disclosure. In many respects, the exemplary storage architecture 100 of FIG. 4 is substantially similar to that of FIG. 1. FIG. 5 is a diagram of a stack table 500 according to aspects of the present disclosure. FIG. 6 is a diagram of a device table 600 according to aspects of the present disclosure.

Referring first to block 302 of FIG. 3 and to FIG. 4, a storage system 102 detects that a storage device 106 is in need of a name. This may occur when a storage device 106 is added to the storage system 102 or when the configuration of the storage system 102 changes and renders a previous name invalid. Accordingly, while the storage device in need of a name may be referred to as an "unnamed device", it may be a storage device with an invalid name. In some embodiments, a user provides an administrative command to the storage system 102 indicating that a storage device 106 is in need of a name. In some embodiments, components of the storage system 102 detect the unnamed storage device 106 and alert the storage system 102. For example, in one such embodiment, a disk shelf 208 that contains the storage device 106 provides an alert to a coupled storage controller 104 that begins the process of naming the storage device 106. The commands or alerts may take any suitable form often depending on the communication protocol used by the storage devices. For example, the SCSI protocol defines a set of SCSI commands such as REPORT_LUNs that are used to determine what devices correspond to a SCSI target. In some embodiments, unnamed storage devices are detected during a periodic LUN-scanning process.

Referring to block 304, the storage system 102 determines a shelf identifier for a disk shelf 208 that contains the unnamed storage device 106. In various embodiments, the shelf identifier includes a shelf UID and/or one or more shelf names (i.e., shelf IDs) corresponding to the disk shelf 208.

The shelf UID is a unique identifier assigned to the disk shelf 208 and may remain constant irrespective of changes to other names or aliases used by the disk shelf 208. The shelf UID may take any form and, in an exemplary embodiment, is a 16-digit hexadecimal number. A disk shelf name may act as a more recognizable or easier to read identifier and may include a text string. In contrast to some shelf UIDs that are a permanent property of a disk shelf 208, a shelf name may be assigned and reassigned to the disk shelf 208 by the storage system 102.

Referring to block 306 of FIG. 3 and to FIG. 4, the storage system 102 determines whether the shelf UID has a corresponding entry in a stack table 500. A stack refers to those disk shelves 208 that are coupled along a particular communication path, and the stack table 500 records the relationships between disk shelves 208 and stacks. In an exemplary storage system 102 utilizing Fibre Channel arbitrated loops, each loop is a communication path and has a corresponding stack. Each stack includes those disk shelves 208 coupled by the respective loop. In an exemplary storage system 102 utilizing daisy-chained disk shelves 208, each path through the disk shelves 208 has a corresponding stack. In an exemplary storage system 102 utilizing a star-based topology, a stack includes those disk shelves 208 coupled to a particular port of a storage controller 104. Because the connection paths may depend on the physical arrangement of the disk shelves 208 in the storage system 102, the stack may provide information about the physical arrangement of those disk shelves 208 within the stack. For example, in some embodiments, a stack corresponds to an enclosure 204, and each disk shelf 208 within the enclosure 204 is part of a single stack. A stack may also span multiple enclosures 204 and/or enclosure portions. Knowing the stack a particular disk shelf 208 is part of may prove useful in locating a disk shelf 208 or a storage device 106.

Referring to FIG. 5, the stack table 500 may take any suitable format including a linked list, a tree, a table such as a hash table, an associative array, a state table, a flat file, a relational database, and/or other memory structure. In the illustrated embodiment, the stack table 500 includes a set of entries 502 correlating shelf UIDs to stack IDs for determining which stack contains a particular disk shelf 208. A stack ID is a name assigned by the storage system 102 to a stack. The stack ID may take any form and, in an exemplary embodiment, is a 2-byte binary number. In some embodiments, a stack may have one or more other names that are more recognizable or easier to read identifier and may include a text string. The work of creating and maintaining the stack table 500 may be performed by any component of the storage system 102. For example, the stack table 500 may be maintained by one or more storage controllers 104 of the storage system 102. In one embodiment, each of the storage controllers 104 is operable to maintain and update the stack table 500. The stack table 500 may be stored on a memory element within one or more of the storage controllers 104, on a memory element shared between the storage controllers 104, and/or on any other suitable memory element of the storage system 102. Rather than a single monolithic database, in some embodiments, each storage controller 104 maintains and updates a replicated copy of the stack table 500.

Referring to block 308 of FIG. 3, when a shelf UID does not have a corresponding entry 502 in the stack table 500, the storage system 102 may determine whether the associated stack already has a stack ID or whether a new stack ID should be assigned. To determine this, the storage system 102 may look to the other shelves 208 on the same stack. For example, the storage system 102 may determine shelf UIDs for the other disk shelves 208 that share the stack. The storage system 102 may then query the stack table for these shelf UIDs to find their respective stack IDs. If a stack ID can be found using another disk shelf 208, in block 310, an entry 502 is added to the stack table 500 based on the stack ID determined in block 308 and the shelf UID for the disk shelf 208 that contains the unnamed storage device 106. If no stack ID is found in block 308, the storage system 102 assigns the stack a new stack ID and adds an entry 502 to the stack table 500 based on the new stack ID and the shelf UID as shown in block 312. Upon determining a stack ID, the stack ID, shelf UID, and/or shelf name may be provided to the disk shelf 208 to display on the shelf display 212. This may assist technicians in locating the respective hardware.

Referring to block 314, the storage system 102 constructs a name for the unnamed storage device 106 based on the physical location of storage device. The name may reference the shelf UID determined in block 304, the shelf name (i.e., shelf ID) determined in block 304, the stack ID determined in block 306, 310, or 312, and/or a bay 210 identifier. In some embodiments, the name includes the stack ID, the shelf ID, the bay identifier, and/or another identifier unique to the storage device 106. In one such embodiment, the name has the form "<stack ID>.<shelf ID>.<bay identifier>", such as "1.0.4" signifying that the storage device is coupled to stack "1" and housed in shelf "0", bay "4". When a bay 210 is large enough to house more than one storage device 106, the name may be appended with a position number representing the position within the bay. Of course, this naming format is merely exemplary, and other formats are both contemplated and provided for. For example, in various embodiments, storage device names take the form of "<shelf ID>.<bay identifier>.<position>" and/or "<shelf ID>.<bay identifier>.<SCSI LUN>".

In this way, the method 300 provides a naming scheme based on those attributes that signify the physical location of the named storage device 106. This provides numerous advantages. As a stack ID corresponds to one or more enclosures 204 and a shelf identifier corresponds to a particular shelf 208, a user can quickly locate a failing storage device 106, for example. This may be particularly useful when other methods of locating devices, such as triggering a storage device 106 to illuminate an LED or other indicator, fail. A user can also easily determine the name that will be assigned to a new storage device 106 to be added to the storage system 102. This may prove useful when configuring the storage system 102.

The naming convention also has advantages when assigning storage devices 106 to RAID groups or other redundancy groups. In some embodiments, the storage system 102 allows a user to specify a storage device group using a wildcard. Groups can be striped (divided) across multiple disk shelves 208 by wildcarding the disk shelf portion of the device names. For example, a user may specify a group containing all storage devices 106 named "1.*.4", signifying all storage devices 106 within the stack "1" and located at bay "4", regardless of the respective disk shelf 208. Striping redundancy groups in this fashion provides better safeguards against failure of a disk shelf 208, and the naming convention of method 300 provides a simplified framework for creating such groups. As a final exemplary advantage, this naming technique may reduce the number of names assigned to a storage device 106. In contrast to some path-based naming conventions, a single name can be used to unambiguously identify the storage device 106 regardless of the number of different storage controllers 104 that the storage device 106 is coupled to because the name does not include and is not dependent on the primary storage controller 104 in communication with the storage device 106.

Referring to block 316 of FIG. 3 and to FIG. 4, the storage system 102 updates a device table 600 based on the storage device name constructed in block 314. The device table 600 provides a record of the assigned storage device names for use by the storage controllers 104 and other components of the storage system 102. Referring to FIG. 6, the device table 600 may take any suitable format including a linked list, a tree, a table such as a hash table, an associative array, a state table, a flat file, a relational database, and/or other memory structure. In the illustrated embodiment, the device table 600 includes a set of entries 602 correlating a device name to a unique identifier of the device (a device UID), a corresponding shelf UID, a corresponding shelf ID, a corresponding stack ID, a corresponding bay number, and/or other suitable configuration information. It is understood that these fields are merely exemplary. Accordingly, updating the device table 600 based on the storage device name may include adding one or more entries 602 to the device table based on the storage device name. Once the device table 600 is updated, the name is recognized by any of the storage controllers 104 of the storage system 102.

Figure 7:
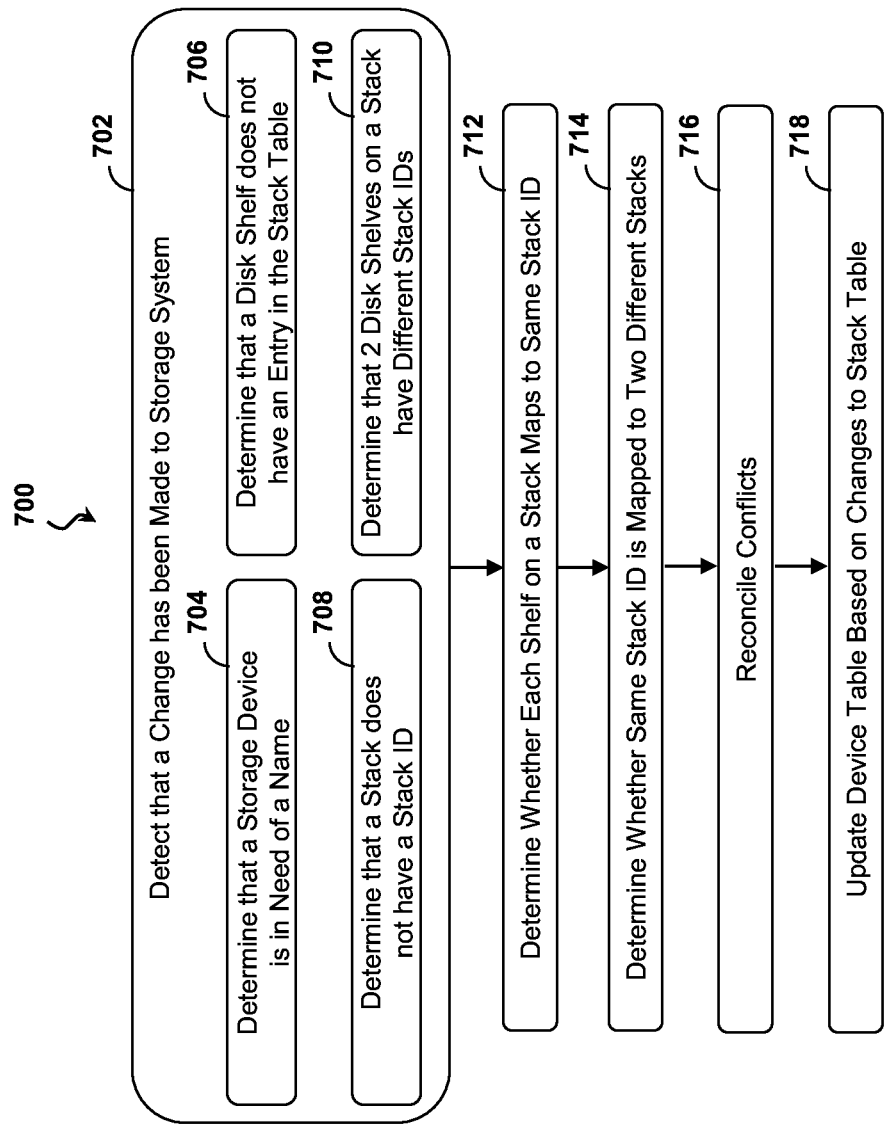
FIG. 7 is a flow diagram of a method for reconciling a naming environment with a current state of a storage system.

In order to keep storage device names up-to-date as the storage system 102 configuration changes, it may be beneficial to periodically reconcile the stack table 500 and the device table 600. For example, when a shelf is moved to form a new stack, the current stack ID in the stack table 500 may no longer be valid. Similarly, when a shelf is moved to an existing stack, the stack ID in the stack table 500 may no longer be valid. As a final example, a race condition or other timing error may result in an attempt to assign a stack ID to two or more stacks. FIG. 7 is a flow diagram of a method 700 for reconciling the naming environment with a current state of a storage system 102. The method 700 is suitable for performing by the storage systems 102 of FIGS. 1 and 4. It is understood that additional steps can be provided before, during, and after the steps of method 700, and that some of the steps described can be replaced or eliminated for other embodiments of the method.

Referring first to block 702, a storage system 102 detects that a change has been made to the storage system 102. Relevant changes include changes in the physical locations of disk shelves 208 and/or storage devices 106, changes in connectivity, adding or removing disk shelves 208 and/or storage devices 106, hardware failures, and/or other relevant system changes. Referring to block 704, in some embodiments, determining that a storage device is in need of a device name, such as that of block 302 of method 300, also indicates a change for the purposes of block 702 of method 700. Thus, method 300 and method 700 may be performed together, either sequentially or concurrently. Referring to block 706, detecting a change may include determining that a disk shelf 208 does not have a corresponding entry 502 in the stack table 500. Referring to block 708, detecting a change may include determining that a stack does not have a stack ID. Referring to block 710, detecting a change may include determining that two disk shelves 208 on the same stack map to different stack IDs in the stack table 500. These examples are non-limiting, and other conditions that indicate a change in the storage system 102 are both contemplated and provided for.

Referring to block 712, upon determining that the storage system 102 has changed, the storage system 102 queries the stack table 500 to determine whether each disk shelf 208 on a given stack maps to the same stack ID in the stack table

500. Referring to block 716, the storage system 102 may reconcile these entries 502 by assigning a new stack ID or by taking other corrective action. In an exemplary embodiment, the storage system 102 sorts the disk shelf UIDs according to the stacks that the respective disk shelves 208 are connected to. The storage system 102 then queries the stack table 500 using the shelf UIDs to determine whether each disk shelf 208 on a given stack maps to the same stack ID. In the example, if disk shelves 208 of a particular stack map to more than one stack ID, and the associated entries 502 are considered invalid. The stack is assigned a new stack ID, and the entries 502 are updated with the new stack ID.

Referring to block 714, the storage system 102 queries the stack table 500 to determine whether the stack table 500 has assigned the same stack ID to two or more stacks. If stack ID duplicates are found, any suitable corrective action may be taken to reconcile the discrepancy in block 716. In various exemplary embodiments, the storage system 102 invalidates the entries 502 associated with one, some, or all of the stacks and new stack IDs are assigned. The storage system 102 then updates the associated entries 502 with the new stack IDs.

Referring to block 718, if changes are made to the stack table 500, the storage system 102 updates the entries 602 of the device table 600 based on these changes. This may include assigning new names to the storage devices 106 as described in block 314 of FIG. 3.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors of the storage system 102 execute code to implement the actions described above.

Thus, the present disclosure provides a system and method for identifying storage devices according to their physical locations. In some embodiments, a method for uniquely identifying a storage device among an array of storage devices of a storage system is provided. The method comprises identifying a storage device of the storage system to assign a name to. A shelf identifier of a shelf in which the storage device is installed is determined. A stack identifier associated with a connection of the storage device is also determined. The storage system constructs a device name for the storage device based on the shelf identifier and the stack identifier. The method may further comprise determining a bay in which the storage device is installed, and the constructing of the device name may further constructs the device name based on an identifier of the bay. In one such embodiment, the device name includes the stack identifier, the shelf identifier, and the identifier of the bay.

In further embodiments, a storage system is provided that comprises a processing resource; a memory for containing a first memory structure mapping storage devices to storage device names; a storage controller; and at least one storage device housed in a bay of a storage device shelf and communicatively coupled to the storage controller. The storage system is operable to: determine when the storage device is unnamed and/or associated with an invalid name; assign the storage device a name based on at least one of: a stack identifier associated with the storage device shelf; a shelf identifier associated with the storage device shelf; and a bay identifier associated with the bay; and update an entry of the first memory structure associated with the storage device based on the assigned name. In one such embodiment, the memory is further for containing a second memory structure mapping shelf identifiers to stack identifiers, and the storage system is further operable to query the second memory structure using the shelf identifier to determine the stack identifier.

In yet further embodiments, an apparatus comprising a non-transitory, tangible computer readable storage medium storing a computer program is provided. The computer program has instructions that, when executed by a computer processor, carry out: identifying a storage device to name; determining an identifier of a structure in which the storage device is housed; assigning a name to the storage device based on the identifier; and updating a table of device names based on the assigned name. In one such embodiment, the enclosure includes a storage device shelf and the identifier includes a shelf identifier, and the computer program has further instructions that carry out querying a table of stack identifiers using the shelf identifier to determine a stack identifier associated with the storage device shelf. In the embodiment, the assigned name is further based on the stack identifier.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

Determining, by a computing device, a shelf identifier of a storage device shelf in which a network storage device installed;

Determining, by the computing device, a stack identifier associated with a network communication path of the storage device shelf in which the network storage device is installed and coupled to the network communication path, wherein the determining of the stack identifier further comprises querying, by the computing device, a table using the shelf identifier to determine when a corresponding entry exist that specifies the stack identifier, querying, by the computing device, the table to determine when each storage device shelf coupled to a given stack maps to a single stack identifier; and updating, by the computing device, the table to assign a new stack identifier to each storage device shelf coupled to the given stack, when the determining indicates that each storage device shelf coupled to the given stack does not map to a single stack identifier; and Constructing, by the computing device, a device name for the network storage device based on the shelf identified and the stack identifier.

2. The method of claim 1, further comprising:
Determining, by the computing device, a bay in which the network storage device is installed, wherein the constructing the device name is further based on an identifier of the bay.

3. The method of claim 1, further comprising:
Determining, by the computing device, a bay in which the network storage device is installed, wherein the constructing the device name is further based on a identifier of the bay.

4. The method of claim 2, wherein the device name includes the stack identifier, the shelf identifier, and the identifier of the bay.

5. The of claim 1, wherein the corresponding entry is a first entry, and wherein the determining of the stack identifier further comprises when the determining indicates that the first entry does not exist in the table:
querying, by the computing device, the table using another shelf identifier associated with another storage device shelf communicatively coupled to stack also communicatively coupled to the storage device shelf; and
Determining, by the computing device, when a second entry exists that corresponds to the another storage device shelf and that specifies the stack identifier; and
Updating, by the computing device, the table based on the stack identifier and the shelf identifier and the shelf identifier when the determining that the second entry exists.

6. The method of claim 5, wherein the determining of the stack identifier further comprises when the determining indicates that the second entry does not exist in the table:
Assigning, by the computing device, an unused stack identifier as the stack identifier; and
Updating, by the computing device, the table based on the assigned stack identifier and the shelf identifier.

7. The method of claim 1, further comprising:
Querying, by the computing device, the table to determine when a single stack identifier has been assigned to two or more stacks; and
Updating, by the computing device, the table to assign a new stack identifier to at least one of the two or more stacks when the determining indicates that the single stack identifier has been assigned to two or more stacks.

8. The method of claim 1, wherein the identifying of the storage device includes at least one of:
Detecting, by the computing device, that the network storage device has been added;
Detecting, by the computing device, that a configuration of the computing device has changed; or
Receiving, by the computing device, a user command.

9. A computing device comprising:
a memory containing machine readable medium comprising machine executable code having stored thereon instructions for performing a method for uniquely identifying a storage device; and
a processor coupled to the memory, the processor configured to execute the machine executable code to cause the processor to:
determine a shelf identifier of a storage device shelf in which a storage device is installed;
determine a stack identifier associated with a network communication path of the storage device shelf in which the storage device is installed and coupled to the network communication path, wherein the determine the stack identifier further comprises;
query a table using the shelf identifier to determine when a first entry exists that specifies the stack identifier;
query the table to determine when each storage device shelf coupled to given stack maps to a single stack identifier;
update the table to assign a new stack identifier to each storage device shelf coupled to the given stacks, when the determination indicates that each storage device shelf coupled to the given stack does not map to a single stack identifier; and
construct a device name for the storage device based on the shelf identifier and the stack identifier.

10. The device of claim 9, wherein the determine the stack identifier further comprises machine executable code to cause the processor to:
querying a table using the shelf identifier to determine when a first entry exists that specifies the stack identifier;
query the table using another shelf identifier associated with another storage device shelf communicatively coupled to the storage device shelf when the query indicates that the first entry does not exist in the table;
determine when a send a second entry exist that corresponds to the another storage device shelf and that specifies the stack identifier; and
update the table based on the stack identifier and the shelf identifier when the determination indicates that the second entry exist.

11. The device of claim 10, wherein the processor is further configured to execute the machine executable code to:
Assign an unused stack identifier as the stack identifier when the determination indicates that the second entry does not exist in the table; and
Update the table based on the assigned stack identifier and the shelf identifier.

12. The device of claim 9 wherein the processor is further configured to execute the machine executable code to:
Querying the table to determine when a single stack identifier has been assigned to two or more stacks; and
Update the table to assign a new stack identifier to at least one of the two or more stacks when the determination indicates that the single stack identifier has been assigned to two or more stacks.

13. A non-transitory computer readable medium having stored thereon instructions for performing a method comprising machine executable code which when executed by at least one machine, causes the machine to:
determine a shelf identifier of a storage device shelf in which a network storage device is installed;
determine a stack identifier associated with a network communication path of the network storage device shelf in which the network storage device is installed and coupled to the network communication path, wherein the determine the stack identifier further comprises;
query a table using the shelf identifier to determine when a first entry exists that specifies the stack identifier;
query the table to determine when each storage device shelf coupled to a given stack maps to a single stack identifier;
update the table to assign a new stack identifier to each storage device shelf coupled to the given stack, when the determination indicates that each storage device shelf coupled to the given stack does not map to a single stack identifier; and construct a device name for the network storage device based on the shelf identifier and the stack identifier.

14. The medium of claim 13, wherein the determine the stack identifier further comprises machine executable code which when executed by at least one machine, causes the machine to:
   Query a table using the shelf identifier to determine when a first entry exists that specifies the stack identifier;
   Query the table using another shelf identifier associated with another storage device shelf communicatively coupled to a stack also communicatively coupled to the storage device shelf when the query indicates that the first entry does not exist in the table;
   Determine when a second entry exists that corresponds to the another storage device shelf and that specifies the stack identifier; and
   Update the table based on the stack identifier and the shelf identifier when the determination indicates that the second entry exists.

15. The medium of claim 14, further comprises machine executable code which when executed by at least one machine, causes the machine to:
   Assign an unused stack identifier as the stack identifier when the determination indicates that the second entry does not exist in the table; and
   Update the table based on the assigned stack identifier and the shelf identifier.

16. The medium of claim 13, further comprising machine executable code which when executed by at least one machine, causes the machine to:
   Query the table to determine when a single stack identifier has been assigned to two or more stacks; and
   Update the table a new stack identifier to at least one of the two or more stacks when the determination indicates that the single stack identifier has been assigned to two or more stacks.

\* \* \* \* \*